(12) United States Patent
Steinke, II (10) Patent No.: US 10,772,453 B2
(45) Date of Patent: Sep. 15, 2020

(54) EARTH OVEN

(71) Applicant: Richard P. Steinke, II, Indio, CA (US)

(72) Inventor: Richard P. Steinke, II, Indio, CA (US)

( * ) Notice: Subject to any disclaimer, the term of this patent is extended or adjusted under 35 U.S.C. 154(b) by 275 days.

(21) Appl. No.: 15/413,064

(22) Filed: Jan. 23, 2017

(65) Prior Publication Data
US 2017/0224147 A1  Aug. 10, 2017

Related U.S. Application Data

(60) Provisional application No. 62/293,468, filed on Feb. 10, 2016.

(51) Int. Cl.
| | | |
|---|---|---|
| *A47J 37/07* | (2006.01) | |
| *A47J 27/00* | (2006.01) | |
| *A47J 36/06* | (2006.01) | |
| *A47J 36/16* | (2006.01) | |
| *A47J 33/00* | (2006.01) | |

(52) U.S. Cl.
CPC ............ *A47J 27/002* (2013.01); *A47J 33/00* (2013.01); *A47J 36/06* (2013.01); *A47J 36/16* (2013.01)

(58) Field of Classification Search
CPC .. A47J 37/07–0727; A47J 37/0731–074; A47J 37/0745–0759; A47J 37/0763–0772; A47J 2037/0777; A47J 2037/0795
See application file for complete search history.

(56) References Cited

U.S. PATENT DOCUMENTS

| | | | | |
|---|---|---|---|---|
| 1,250,861 A | * | 12/1917 | Hackney ............. | A47J 37/0763 126/9 R |
| 1,448,148 A | * | 3/1923 | O'Kane ................. | F24B 1/205 126/29 |
| 2,839,043 A | * | 6/1958 | La Born ................ | F24B 1/205 126/30 |
| 3,667,446 A | * | 6/1972 | Morton .................. | A47J 37/07 126/25 C |
| 4,126,116 A | * | 11/1978 | McCallum .......... | A47J 37/0763 126/9 R |
| 4,598,690 A | * | 7/1986 | Hsu ......................... | F24C 1/16 126/25 R |
| 5,105,726 A | * | 4/1992 | Lisker .................. | A47J 37/0763 99/340 |
| 5,333,540 A | * | 8/1994 | Mazzocchi .......... | A47J 37/0763 126/25 R |
| 5,515,774 A | * | 5/1996 | Swisher ................ | A47J 37/041 99/340 |
| 5,660,101 A | * | 8/1997 | Cirigliano ............ | A47J 37/047 126/25 A |
| 5,713,344 A | * | 2/1998 | Gilbert ................ | A47J 37/0772 126/25 R |

(Continued)

Primary Examiner — Michael A Laflame, Jr.
(74) Attorney, Agent, or Firm — Law Office of Michael O'Brien; Michael O'Brien; Jack Fritz (57) ABSTRACT

This invention relates to the field of portable ovens, specifically a portable oven designed to be placed in the ground to employ specific heating and cooking technologies. This portable invention includes several layers or components: a ground layer, or the cavity dug in the terrain, a fire layer, a stone layer or other heating element, a lower layer of packing material, the food layer, an upper layer of packing material, and the cap. The portability of the invention and interchangeability of the parts allow the user to easily create unique cuisine.

6 Claims, 10 Drawing Sheets

(56) References Cited

U.S. PATENT DOCUMENTS

| | | | | |
|---|---|---|---|---|
| 6,012,381 | A * | 1/2000 | Hawn | A47J 27/14 |
| | | | | 126/25 R |
| 6,347,577 | B1 * | 2/2002 | Harneit | A47J 37/047 |
| | | | | 99/419 |
| 6,439,109 | B1 * | 8/2002 | Rehill | A47J 37/041 |
| | | | | 99/421 H |
| 6,439,111 | B1 * | 8/2002 | Lu | A47J 37/0763 |
| | | | | 126/25 R |
| 6,973,927 | B1 * | 12/2005 | Stewart | A47J 37/0786 |
| | | | | 126/201 |
| 8,028,698 | B2 * | 10/2011 | Hodos | A61M 16/06 |
| | | | | 128/206.21 |
| 10,219,653 | B1 * | 3/2019 | Ruiz | A47J 37/0763 |
| 2005/0155496 | A1 * | 7/2005 | Lu | A47J 37/0704 |
| | | | | 99/419 |
| 2012/0037012 | A1 * | 2/2012 | Stier | A47J 37/041 |
| | | | | 99/421 H |
| 2012/0255537 | A1 * | 10/2012 | Kanwar | A47J 37/0704 |
| | | | | 126/25 AA |
| 2014/0326720 | A1 * | 11/2014 | Probst | F24C 1/16 |
| | | | | 220/6 |
| 2017/0013999 | A1 * | 1/2017 | Horsfield | A47J 37/0763 |
| 2018/0010802 | A1 * | 1/2018 | Probst | F24C 1/16 |
| 2018/0333003 | A1 * | 11/2018 | Huang | A47J 37/079 |

* cited by examiner

EARTH OVEN

FIELD OF THE INVENTION

This invention relates to the field of portable ovens, specifically a portable oven designed to be placed in the ground to employ specific heating and cooking technologies.

BACKGROUND OF THE INVENTION

Remains of ground ovens are known in the archeological record dating back 10,000 years in North America and 30,000 years globally. Scientists have studied forms of these ovens, such as the various pit structure, heating element technology, rock linings and various other elements. Notably, such differences in the historical record evidence a history of innovation relating to improving this ancient form of cooking food.

Benefits of cooking food in a ground oven with a stone layer (as opposed to hot-coal heating and open-flame heating) include cooked food that contains more digestible calories due to rock-heating properties that promote fusion of heat and moisture; and easier-to-chew meat, protein-rich, and complex carbohydrate-rich cooked foods, especially in colder environments.

SUMMARY OF THE INVENTION

An idealized composite of a ground oven would consist of several layers: (1) a ground layer, or the cavity dug in the terrain, (2) a fire layer that has been reduced to ashes and/or embers, (3) a stone layer or other heating element, (4) a lower layer of packing material, (5) the food layer, (6) an upper layer of packing material, and (7) the earthen cap.

Generally, a cooking apparatus would contain a heating element and a surface where the cooking of the food would occur. The ground oven contains additional aspects, such as the stone layer and packing layers, which allow the utilization of all of the properties of heat to contribute to cooking. These additional aspects of the ground oven enable the operator to control and adjust for the thermodynamic properties of heat, such as its intensity and its natural flow of heat from higher energy locations to lower energy locations. The ground oven is particularly useful in controlling for and adjusting for the natural dissipation of heat that ordinary above-ground ovens cannot. The use of stones, or any other object with high heat capacity or thermal mass, decreases the loss of heat due to convection and/or radiation. The water naturally in the ground and soil contributes another effect to the ground oven. As a result of the heating inside the ground oven, attributes of the surrounding soil, such as the surrounding minerals and ground water, flow into the ground oven. Some benefits of this effect include increased nutrients in the food, the ability to control and adapt the acidity and alkalinity of the food, and more efficient break down of proteins making the food more easily digestible. An additional benefit of ground ovens is the reduced risk of fire proliferation in a windy and/or dry environment due to the fact that the heating element is below ground and more easily containable than the above-ground heating element. Subterranean is intended to mean: completely underground.

The above-mentioned advantages of a traditional ground or heathen oven are incorporated into the present invention. An important advantage of this invention is that the oven is portable, as are all the advantages of the traditional ground oven. This invention is capable of being fixed in a particular location as well as being portable. In addition to the preferred embodiment described below, the present invention will be made in different sizes, allowing the user to select the oven which best suits his or her needs. The user of this invention may select any specific terrain that he or she desires to use to cook their food, and then select the exact location to place the invention in an appropriate sized pit. The user may choose to create their own heating element based on the natural surroundings, or attach a pre-made external heating element. The user may locate stones or any other local high-specific heat object to use as the stone layer. The user also has options to personalize which object to use as the food layer, or whether to use a food layer at all. An oven lid is provided in the invention to simulate the effect of the historical earthen cap. The many options available to the user regarding location, type of heating element, use of stone and packaging, as well as the ability of the user to pack up the portable invention and try a different terrain are valuable aspects of the present invention.

BRIEF DESCRIPTION OF THE DRAWINGS

The foregoing and other features of the invention will become apparent from the following drawings and detailed description of the preferred embodiment of the invention.

DETAILED DESCRIPTION OF THE PREFERRED EMBODIMENT

Figure 1:
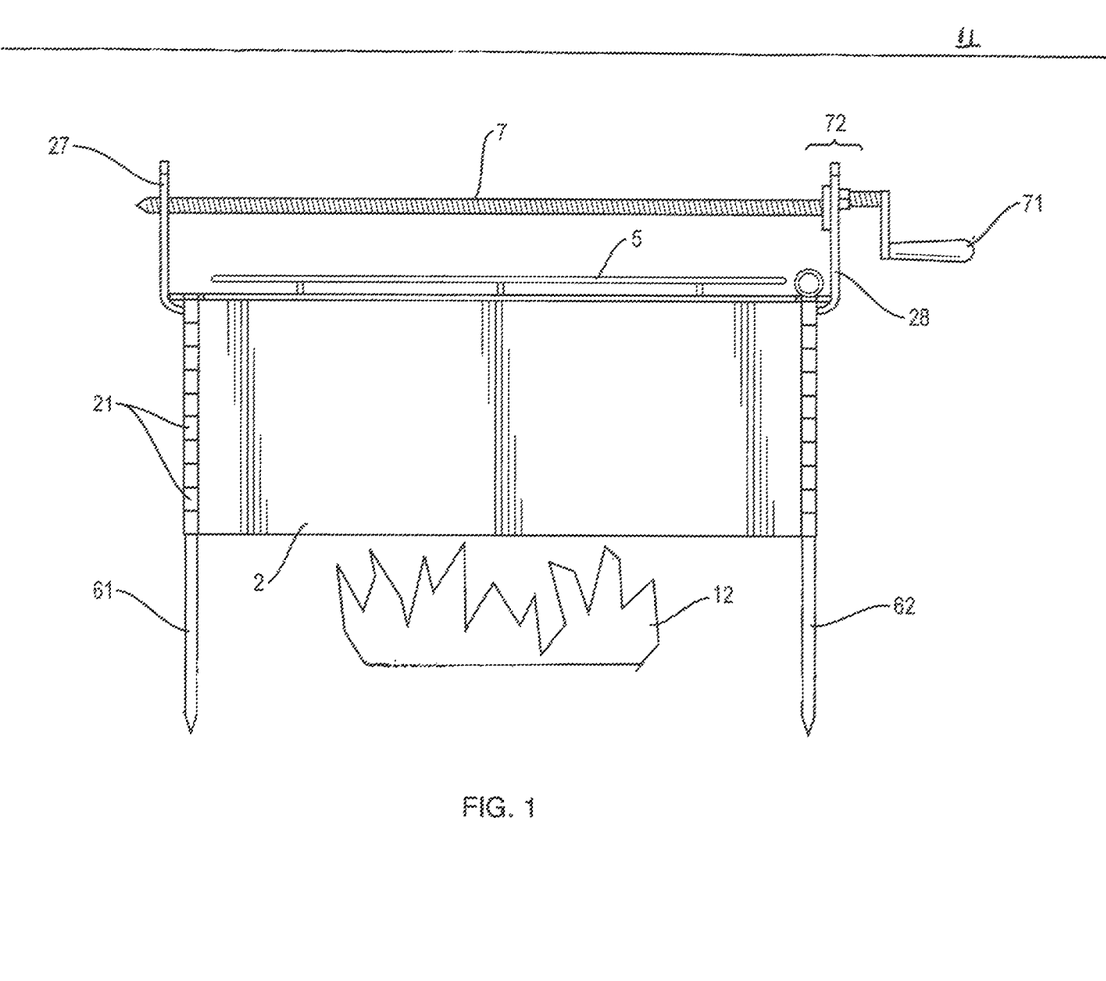
FIG. 1 is a front schematic view of the oven in use.

FIG. 1 is a front schematic view of the invention in the preferred embodiment. The preferred embodiment is not intended to limit the scope of the invention. The invention is placed into the terrain 11 and secured in said terrain with hinges 61 and 62, which may be adjusted for depth by applying a certain force to drive hinges 61 and 62 deeper into terrain 11. FIG. 1 shows a heat source 12 that is used in the preferred embodiment, and may be adjusted by the user. FIG. 1 shows the front view of the cooker body 2, hinge supports 21, and rotisserie supports 27 which are more fully described in FIG. 2. FIG. 1 shows a grill 5, which is more fully described in FIG. 5. FIG. 1 also shows a rotisserie skewer 7, a handle 71 for the rotisserie skewer, and a connector 72 for the rotisserie skewer, which are more fully described in FIG. 7.

Figure 2:
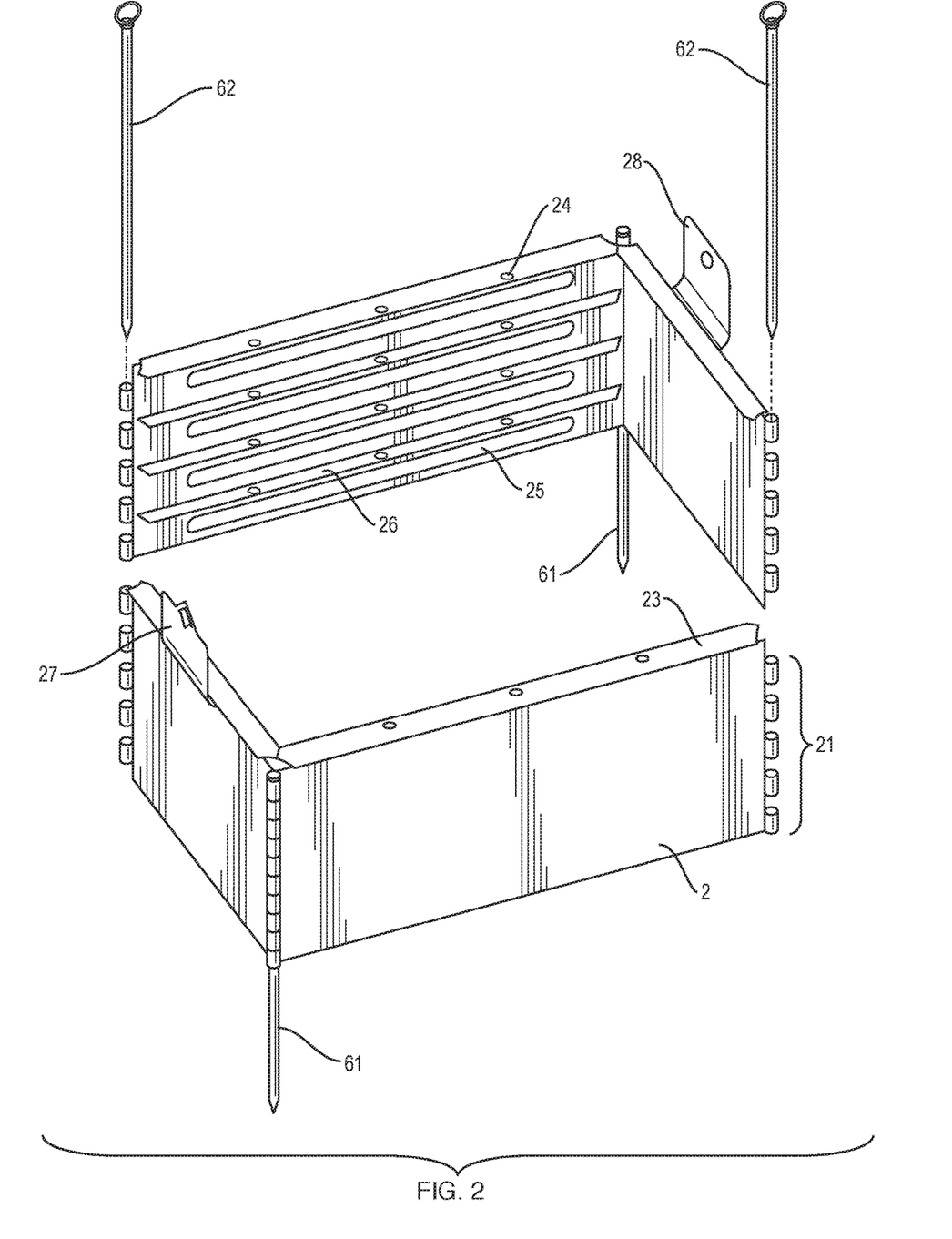
FIG. 2 is a semi-exploded view of the base unit of the oven shown in FIG. 1.

FIG. 2 is a semi-exploded view of the invention in the preferred embodiment. The cooker body is shown in a rectangular shape with four fixed hinges 21 on each corner of the body. On two opposite corners, fixed pins 61 are attached permanently to the body. On the other two corners, removable pins 62 can be added and removed to the fixed hinges 21. The ability of the removable pins 62 to be taken out and replaced allow the user to adjust the grill 5, and to take apart the cooker body for purposes such as cleaning and transportation. On the inside of the cooker body, which is visible in the exploded view are four indentations 25 at varying heights that allow a space to place the grill 5 inside the cooker body, again allowing flexibility for the user. Between the indentations 25 are holders 26 for the grill 5. There are three holes 24 for each holder 26, and there are three holders 26 at varying heights inside the cooker body. The uppermost holder 23 is at the top of the cooker body and extends slightly inside and outside the cooker body, relative to the three holders 26 located inside the cooker body. On two sides of the cooker body, there are handles 27 and 28 that are fixed to the cooker body. Handle 27 has a diamond-shaped perforation, and handle 28 has a circular perforation. Handle 27 has a latch on top which opens to allow the rotisserie skewer 7 to be placed inside handle 27. In the preferred embodiment, the rotisserie skewer handle 71 and connector 72 will be placed in close proximity to handle 27, while the opposite end of rotisserie skewer 7 will be in close proximity to handle 28, as seen in FIG. 1.

Figure 3:
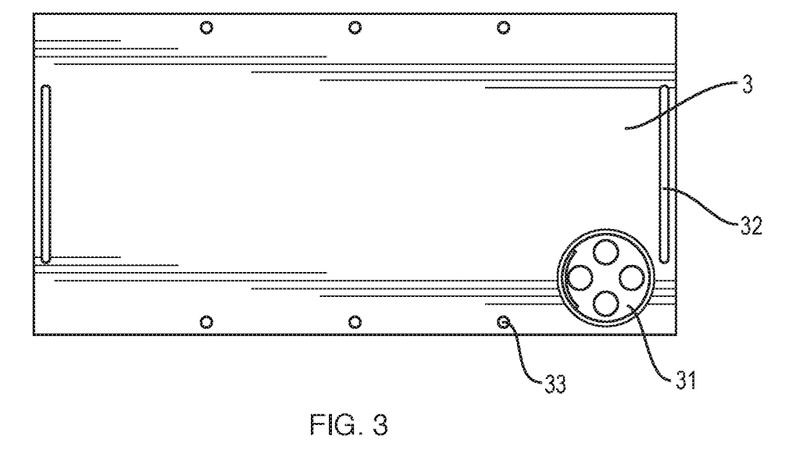
FIG. 3 is the top view of the cover of the oven shown in FIG. 1.

FIG. 3 shows the top view of cover 3 with two handles 32 on either side that the user may grasp to remove the cover. Located in the bottom right of the view in FIG. 3 is a vent 31 that includes four perforations that the user may rotate to allow byproducts of cooking to escape the cooker body. Located on the top and bottom of cover 3 in the view of FIG. 3 are three protruding studs 33 which allow the user to keep cover 3 in place by inserting studs 33 into holes 24.

Figure 4:
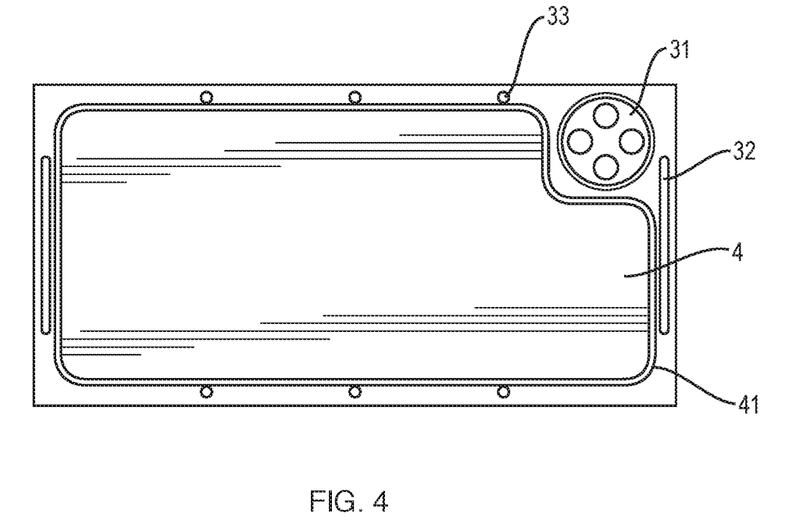
FIG. 4 is the bottom view of the cover of the oven shown in FIG. 1, showing the integral griddle.

FIG. 4 shows the bottom view of cover 3, and also shows the griddle 4 and griddle ridge 41 that the user may use to cook food directly on the griddle to alter the cooking properties as opposed to using grill 5 to cook food. The griddle ridge 41 prevents byproducts of cooking from spilling over and contaminating the terrain 11 where the oven is located.

Figure 5:
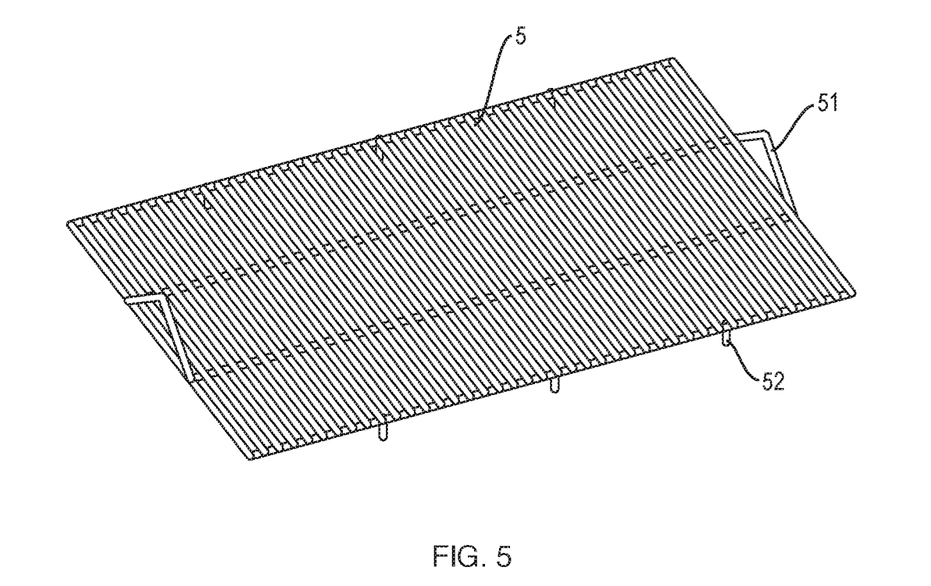
FIG. 5 is the perspective view of the grill component.

FIG. 5 is a perspective view of the grill 5, which has two handles 51 on each side for the user to remove the grill and place at one of the varying indentations 25 within the cooker body. The grill has three studs 52 pointing downward on each side which fit into the holes 24 in any of the four locations within the cooker body.

Figure 6A:
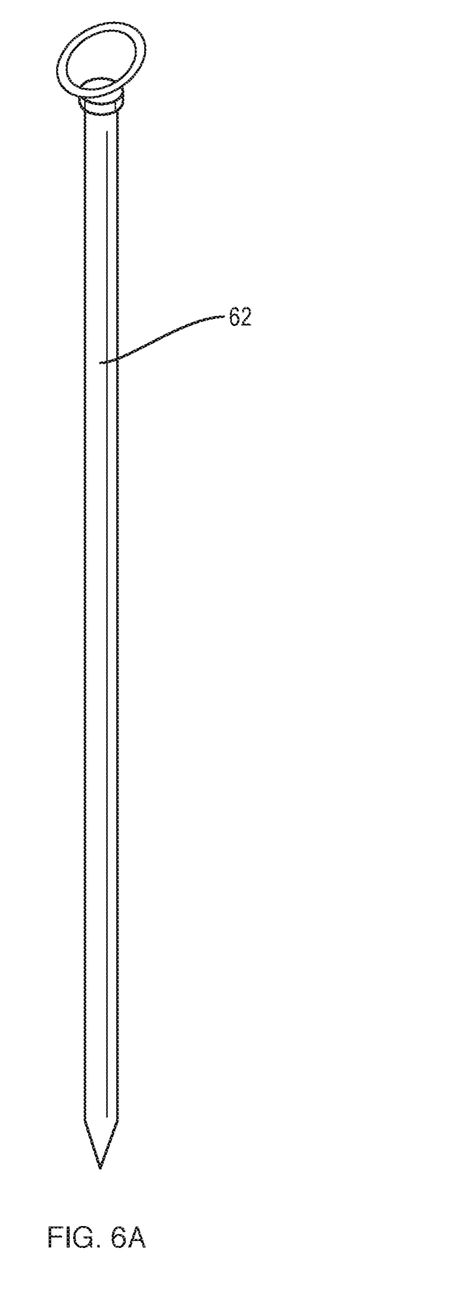
FIG. 6A is a removable hinge pin of the oven shown in FIG. 1.

FIG. 6A is the removable pin 62 with a ring affixed to the pin to allow the user to remove the pin and disassemble the apparatus. The removable pin is designed to be driven into the terrain 11 above the heating element 12.

Figure 6B:
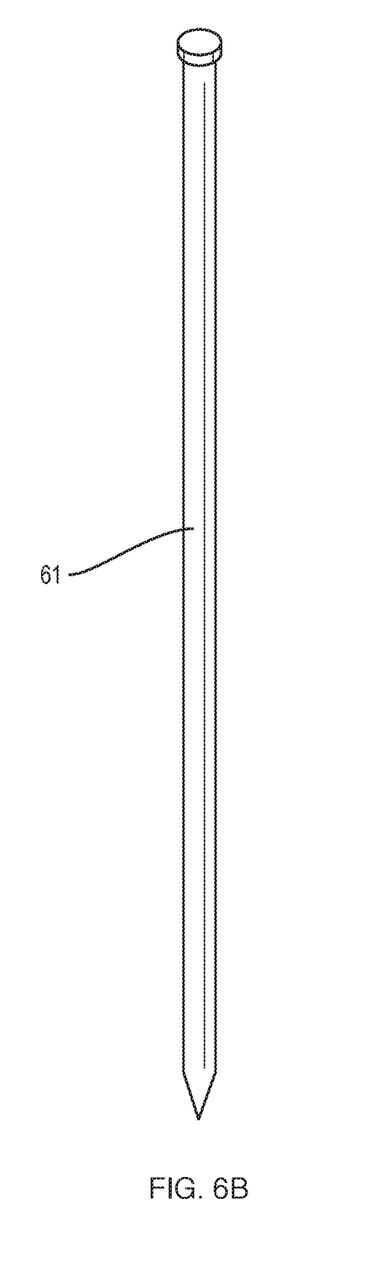
FIG. 6B is a fixed hinge pin of the oven shown in FIG. 1.

FIG. 6B is a view of the fixed pin 61 which is affixed to two of the four corners of the cooker body, and is designed to be driven into the terrain 11 above the heating element 12.

Figure 7:
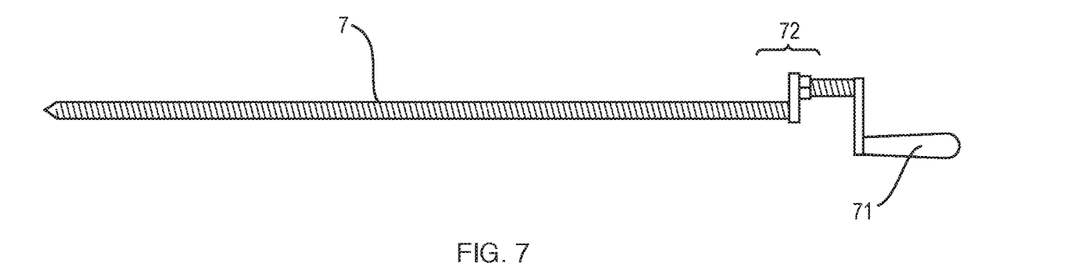
FIG. 7 is the rotisserie skewer component of the oven shown in FIG. 1.

FIG. 7 is the view of rotisserie skewer 7 which as the rotisserie skewer handle 71 connected by a connector 72, which allows the user to crank the rotisserie skewer 7 in a circular motion to cook food over the heating apparatus at an even rate. As shown in FIG. 2, Handle 27 has a diamond-shaped perforation, and handle 28 has a circular perforation. Handle 27 has a latch on top which opens to allow the rotisserie skewer 7 to be placed inside handle 27. In the preferred embodiment, the rotisserie skewer handle 71 and connector 72 will be placed in close proximity to handle 27, while the opposite end of rotisserie skewer 7 will be in close proximity to handle 28, as seen in FIG. 1.

Figure 8:
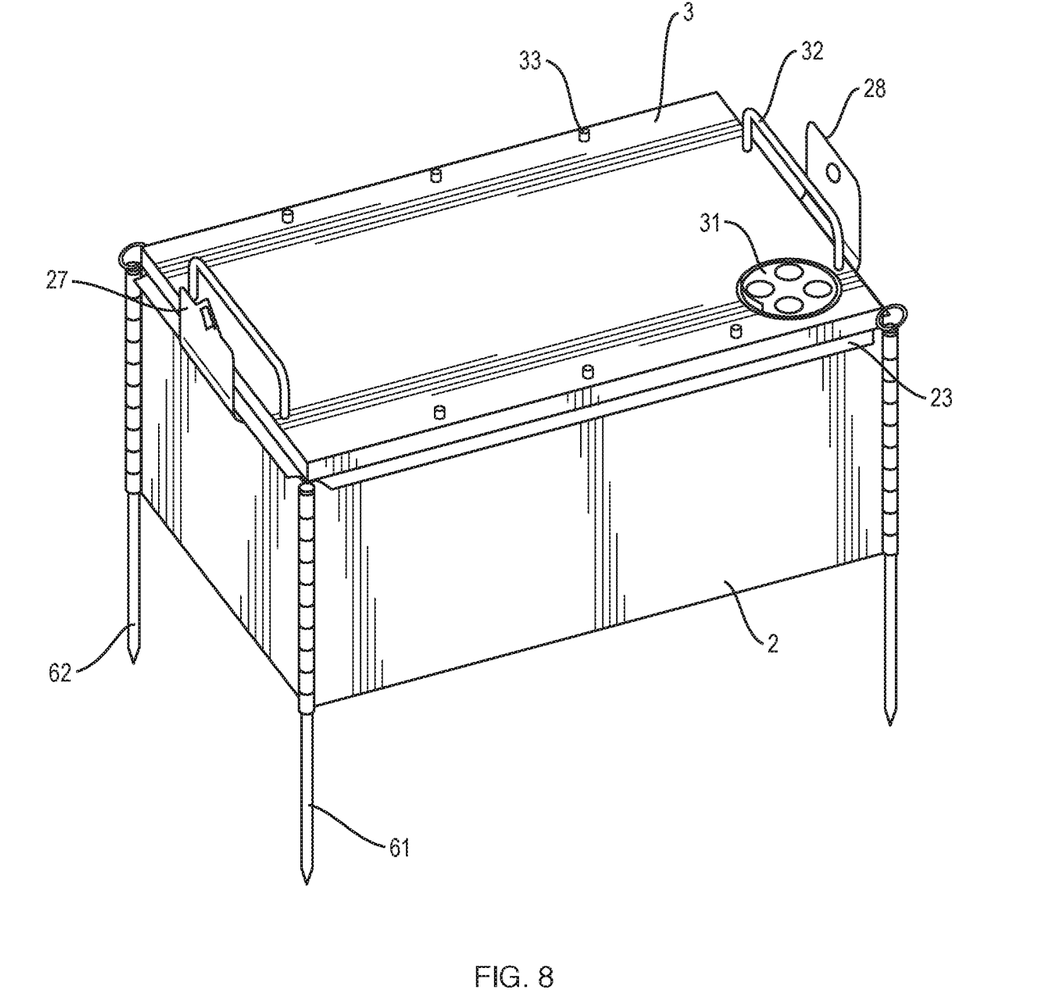
FIG. 8 is a perspective view of the oven shown in FIG. 1 with the cover shown in FIG. 3 and FIG. 4 in place.

FIG. 8 is the perspective view of the invention with the cover 3 in place in the position as cover 3 is viewed in FIG. 3. In this perspective, the uppermost holder 23 at the top of the cooker body is visible as it extends slightly outside the cooker body relative to cover 3.

Figure 9A:
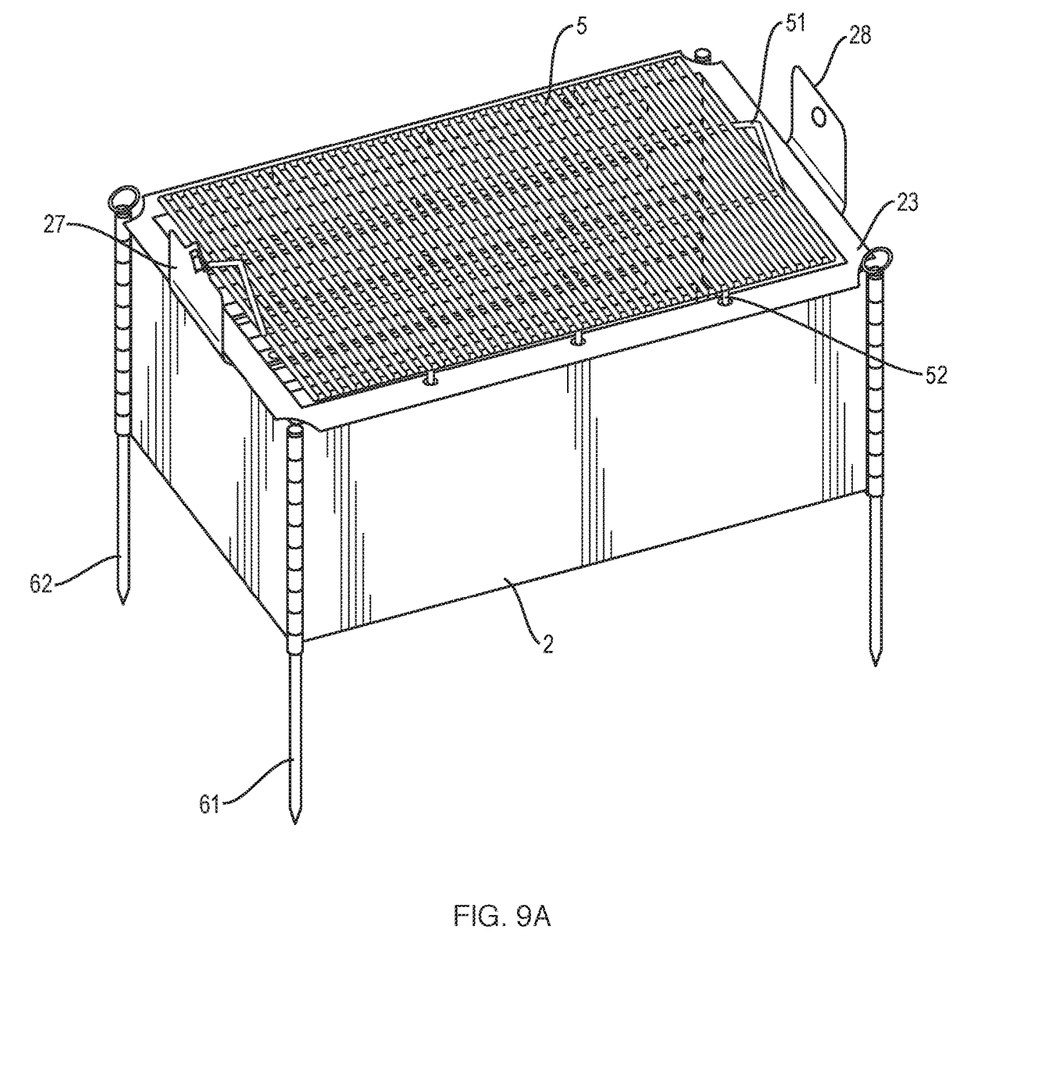
FIG. 9A is a perspective view of the oven shown in FIG. 1 with the grill component shown in FIG. 5 at uppermost position.

FIG. 9A is the perspective view of the invention with grill 5 in place with studs 52 placed within holes 24 in uppermost holder 23 at the top of the cooker body.

Figure 9B:
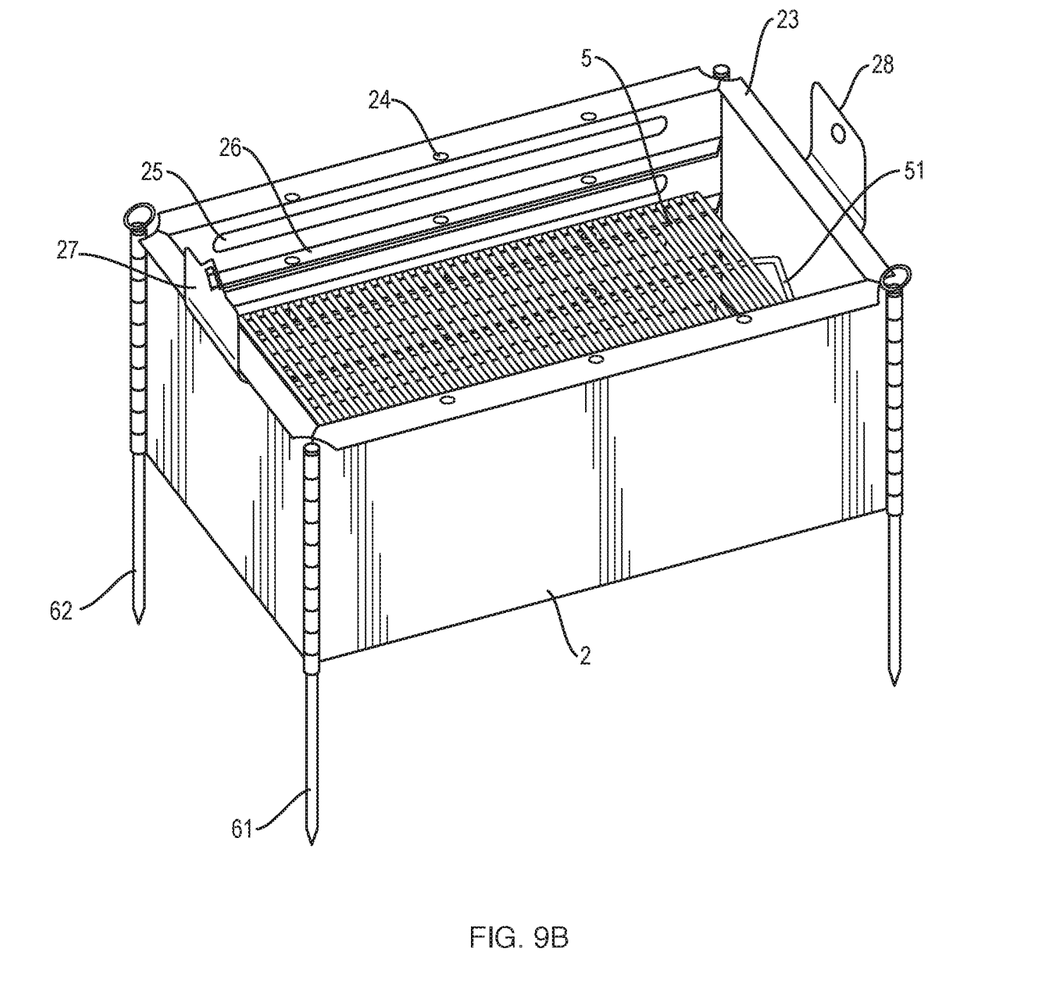
FIG. 9B is a perspective view of the oven shown in FIG. 1 with the grill component shown in FIG. 5 at an alternate, inner position.

FIG. 9B is the perspective view of the invention with grill 5 in place inside the cooker body 2 with studs 52 sitting inside holes 24 at one of the four indentations 25 and said grill 5 held in place by holder 26.

Figure 10:
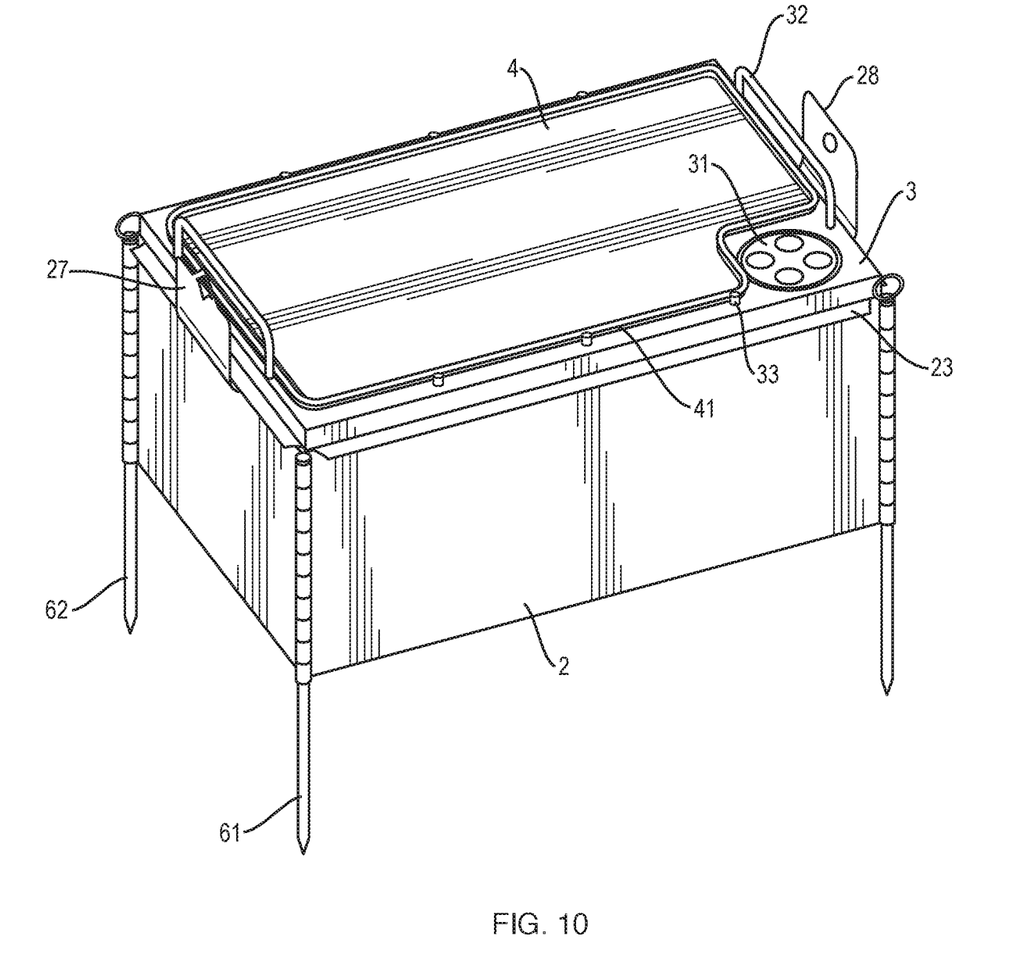
FIG. 10 is a perspective view of the oven shown in FIG. 1 with the cover shown in FIG. 3 and FIG. 4 inverted for utilization of integral griddle shown in FIG. 4.

FIG. 10 is the perspective view of the invention with the cover 3 in place in the position as cover 3 is viewed in FIG. 4. In this perspective, the uppermost holder 23 at the top of the cooker body is visible as it extends slightly outside the cooker body relative to cover 3. In this perspective, as in FIG. 4, the griddle 4 and griddle ridge 41 are visible.

What is claimed is:

1. A portable subterranean cooking apparatus comprising:
   a rectangle-shaped cooking apparatus further comprising:
   a first short side, fixed to a first long side with a first pin forming a first fixed hinge joint;
   a second long side, detachably coupled to the first short side with second pin forming a first unfixed hinge joint;
   a second short side, fixed to a second long side with a third pin forming a second fixed hinge joint;
   wherein the second short side is detachably coupled to the first long side with fourth pin forming a second unfixed hinge joint;
   a first short side uppermost holder, joined to the first short side and extending from a first short side inner surface past a first short side outer surface;
   a first short side handle, joined to the first short side uppermost holder and further comprising a first perforation;
   a second short side uppermost holder, joined to the second short side and extending from a second short side inner surface past a second short side outer surface;
   a second short side handle, joined to the second short side uppermost holder and further comprising a second perforation;
   a skewer arranged through the first perforation and the second perforation; and
   a cover to establish a top of the cooking apparatus.

2. The portable subterranean cooking apparatus of claim 1 wherein the cover contains a temperature gauge, a first cover handle, a second cover handle, and circular vent.

3. The portable subterranean cooking apparatus of claim 1 wherein a bottom of the grill is established by one member of a bottom set consisting of an adjustable griddle layer and an adjustable grill layer.

4. A portable subterranean cooking apparatus comprising:
   a rectangle-shaped cooking apparatus further comprising:
   a first short side, fixed to a first long side with a first pin forming a first fixed hinge joint;
   a second long side, detachably coupled to the first short side with second pin forming a first unfixed hinge joint;
   a second short side, fixed to a second long side with a third pin forming a second fixed hinge joint;
   wherein the second short side is detachably coupled to the first long side with fourth pin forming a second unfixed hinge joint;

a first short side uppermost holder, joined to the first short side and extending from a first short side inner surface past a first short side outer surface;

a first short side handle, joined to the first short side uppermost holder and further comprising a first perforation;

a second short side uppermost holder, joined to the second short side and extending from a second short side inner surface past a second short side outer surface;

a second short side handle, joined to the second short side uppermost holder and further comprising a second perforation;

a rotisserie system comprising a rod, crank, and forks; wherein the rod is arranged through the first perforation and the second perforation;

a cover to establish the top of the cooking apparatus.

5. The portable subterranean cooking apparatus of claim 4 wherein the cover contains a temperature gauge, a first cover handle, a second cover handle, and circular vent.

6. The portable subterranean cooking apparatus of claim 4 wherein a bottom of the grill is established by one member of a bottom set consisting of an adjustable griddle layer and an adjustable grill layer.

* * * * *